March 3, 1942.    D. W. HUDSON    2,275,226
CONNECTOR
Filed Sept. 25, 1940

INVENTOR
DAVID W. HUDSON
BY Wheeler, Wheeler & Wheeler
ATTORNEYS.

Patented Mar. 3, 1942

2,275,226

UNITED STATES PATENT OFFICE 2,275,226

CONNECTOR

David W. Hudson, Green Bay, Wis., assignor to Alden Hudson, Green Bay, Wis.

Application September 25, 1940, Serial No. 358,211

5 Claims. (Cl. 24—208)

This invention relates to improvements in connectors, with particular reference to a connection between a tire chain strap and a tool for applying a tire chain to the wheel of a vehicle. While the invention has particular utility as applied to tire chains, it is also useful for other purposes which may present analogous problems.

There are two primary objects of the invention: first, to provide a connection not greatly thicker than the strap itself, to enable the strap to be manipulated through the extremely small space intervening between the hub and the rim in a modern automobile wheel of conventional design; and secondly, to provide a connector which will transmit, without releasing, a pushing pressure as well as a pulling tension and which will only interlock with the strap when inserted therein from the proper side, whereby the shape of the interfitting parts will automatically ensure the proper application of the tire chain to the tire. In other words, where the invention is used, I seek to make it impossible to apply the tire chain wrong side out.

Further objects of the invention are to provide a novel and simple connection economically manufactured and easily used, which will nevertheless engage securely and even rigidly, if desired, and that will be instantly releasable by manipulation.

Other objects of the invention will appear from the following disclosure thereof.

In the drawing.

Like parts are identified by the same reference characters throughout the several views.

Figure 1:
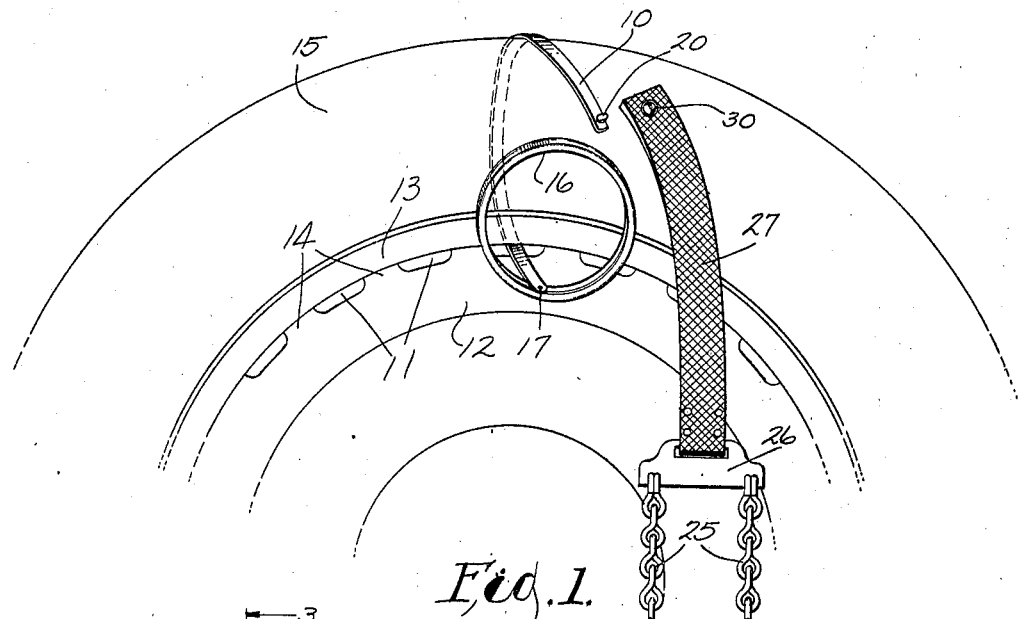
Fig. 1 is a fragmentary view in side elevation of a conventional wheel and tire showing in perspective an improved tool of my invention applied about the tire and an improved tire chain of my invention with which said tool is engageable through the means specifically to be disclosed herein.

The tool 10 may be conveniently made of clock spring or the like, biased to assume substantially the curvilinear form indicated in Fig. 1 so that when the tool is inserted into one of the openings 11 between the hub 12, the rim 13, and the successive spokes 14 of a vehicle wheel, the end of the resilient curvilinear tool will automatically follow around the surface of the tire 15 to a position where it is accessible for attachment of a tire chain to be pulled, by means of the tool, about the tire and through one of the apertures 11.

Figure 2:
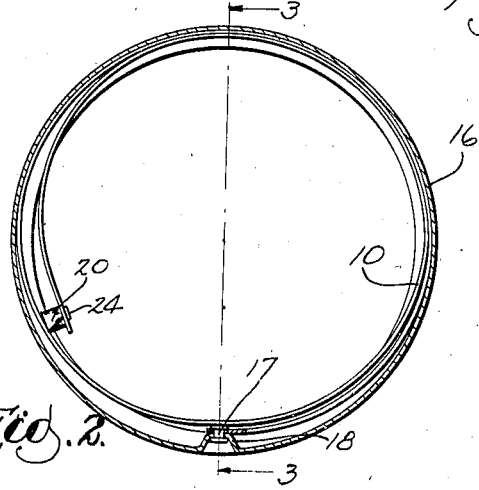
Fig. 2 is a transverse section through the tool as it appears when nested for storage.
Figure 3:
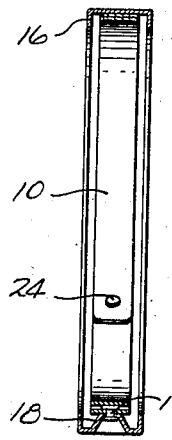
Fig. 3 is a view taken in section on the line 3—3 of Fig. 2.

In the preferred form of the invention the tool 10 is provided with a handle 16 of generally annular form in side elevation and of channel shape in section, within which the tool may be spirally nested as shown in Figs. 2 and 3. A rivet 17 provides a pivotal connection between the tool 10 and the handle 16 whereby the handle may be swung to a position transverse with respect to the end of the tool when the tool is to be used, as in Fig. 1. When the tool is to be stored within the handle it is swung to the position shown in Figs. 2 and 3 in which it is in the plane of the handle to be received within the channel portion thereof. The rivet 17 is preferably located on a raised boss 18 to permit the tool to be swung into and out of the handle at either side.

Figure 7:
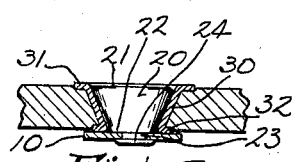
Fig. 7 is a detail view in transverse section showing the parts of the connector engaged operatively in a position for use.
Figure 6:
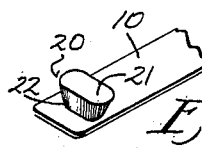
Fig. 6 is a fragmentary detail in perspective of the end of the tool showing the special form of button used thereon in accordance with this invention.

At the free end of the tool, remote from the handle, the tool is provided with a button generically designated by reference character 20. This button has the peculiar form best illustrated in Figs. 6, 7 and 8. Referring to its head or top face 21, it will be noted that its sides may be parallel, though they are not necessarily so. In any event, the sides are elongated with reference to the ends, the latter being preferably rounded. From the head or top face 21 of the button 20, the button is reduced in cross section toward the base portion 22 thereof. It is broadly immaterial whether this reduction be accomplished by a gradual taper as in the preferred form shown in Figs. 6, 7 and 8, or whether the button be shouldered between the head and the base. In either event the elongation of the button transversely with respect to the end of the flexible tool 10 is preserved.

Projecting from the base 22 is a shank 23 of reduced cross section which passes through the spring tool 10 and is upset or riveted at 24 for anchorage to the tool.

The resulting button is elongated transversely of the tool and has a head portion remote from the tool which is larger than its base portion adjacent the tool.

The tire chain set comprises one or more chains 25. Assuming a plurality of chains to be used, they are connected by a yoke 26 to which the strap 27 is fastened, such strap serving as a means of fastening the chains about the tire. Usually the tire chain set is provided with a conventional buckle of some sort into which the strap 27 is received. It must be borne in mind that the present invention must accomplish its objective without so increasing the thickness of the strap as to preclude it from passing either through the apertures 11 of the wheel or through the opening of a conventional buckle.

In accordance with the present invention the end of the strap 27 is apertured and provided with a tubular rivet of special design complementary to the button carried by the tool. The tubular rivet is shown at 30 in Figs. 4, 5, 7 and 8, having a marginal flange or bead 31 at its larger end engaging one face of the strap 27 and a similar flange or bead 32 at its smaller end engaging the other face of the strap 27. Both of the flanges are preferably embedded to a substantial degree in the strap by compression of the material thereof so that the presence of the rivet 30 does not materially increase the thickness of the strap.

Figure 4:
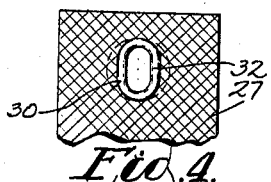
Fig. 4 is a view on an enlarged scale showing a detail in plan of the end of the tire chain and strap, illustrating the special form of tubular rivet used for the purposes of my connector.

The peculiar form of the rivet 30 is such that the end of the rivet about which the flange 31 extends (Fig. 5) presents a very much larger opening than the end of the rivet about which the flange 32 extends (Fig. 4). The area of the opening circumscribed by flange 32 is approximately the same as the area of the top surface of the head 21 of the button of the tire chain tool. However, where the greatest length of the button is transverse with respect to the tool, the greatest length of the opening in the inner end of the rivet is longitudinal with respect to its strap 27 as shown in Fig. 4.

Figure 5:
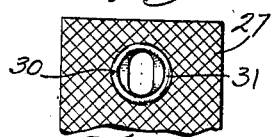
Fig. 5 is a view similar to Fig. 4 but showing the strap inverted.
Figure 8:
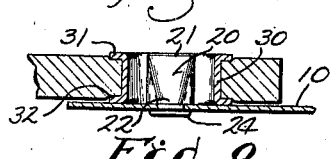
Fig. 8 is a fragmentary detail view similar to Fig. 7 showing the button portion of the connector rotated 90 degrees from its operative position as for insertion or removal.

The transverse dimension is significant. The transverse dimension of the opening circumscribed by the flange 32 at the inner end of the rivet should preferably approximately correspond to the greatest length of the base of the rivet. Thus when the spring tool 10 and the tire chain strap 27 are adjusted to positions approximately at right angles to each other as shown in Fig. 8, the button will readily be received into the rivet 20 from the inner end of the rivet, and when the strap 27 is turned into alignment with the spring tool 10 (at least from the viewpoint of one looking directly at the parts) the button will be turned in the rivet to a position in which it will snugly fit transversely of the elongated opening of the tubular rivet in the manner shown in Fig. 7. Not only does the greatest length of the base of the button correspond to the width of the opening at the inner face of the tubular rivet, but the same is preferably true so far as the head of the button and the outer end of the tubular rivet are concerned. As shown in Fig. 5, the outer end of the tubular rivet is approximately circular and the diameter of the space enclosed therein is approximately equal to the greatest length of the head of the button.

Thus, with the button inserted and the parts manipulated into alignment, a snug and secure connection is provided between the tool 10 and the strap 27, yet the combined thickness of all the parts does not greatly exceed the thickness of the strap itself, since the rivet is embedded in the strap and the head of the button does not project above the rivet. Only the thickness of the clock spring tool 10 and the upset end 24 of the shank of the button adds to the thickness already present in the strap itself. Even with this economy of space there is barely room for the parts to pass through the openings 11 in the wheel.

Should the tire chain become stuck in its passage about the wheel, it is possible for the operator to free the tire chain by pushing on the tool in addition to mere tugging of the chain. Pushing on the tool cannot in any way free the connection between the tool and the strap, since the button and the tubular rivet providing such connection are firmly interlocked against any relative movement except the relative rotation by which alone they may be moved to positions for separation.

When the operator has pulled the strap 27 and the chain about the tire and has drawn the strap through the opening 11 of the wheel into which the tool was originally inserted, the parts necessary to the fastening of the chain upon the wheel are then directly available before the operator and the tool may be disconnected from the strap. This is accomplished by simply turning the tool again to a position approximately at right angles to the strap, or in any event to a position, depending on the location of the rivet, in which the greatest length of the head of the button will register with the greatest length of the opening in the small inner end of the tubular rivet of the strap. Thereupon the button and the rivet may readily be separated, affording no resistance whatever to such separation.

It will be observed that if an attempt be made to apply the tire chain wrong side out, the button will pass freely enough into the larger end of the tubular rivet 30 so long as the tool and the strap are held at right angles. But any attempt to straighten out the strap into a position of alignment with the tool will be resisted by engagement of the head of the button with the small end of the tubular rivet of the strap, into which the head of the button will then be projecting. It is impossible to effect a connection between the parts in this manner. The strap must first be turned over to its proper position and only in this position can the connector function. Accordingly, it is impossible for the operator to make a mistake and to apply the tire chain wrong side out. This result follows from the fact that the button or stud of the tool is only barely long enough to extend into the larger end of the tubular rivet from the smaller end thereof, without passing completely through the rivet. Thus the height of the button or stud with reference to the length of the tubular rivet is significant, as well as the other relative dimensions of the stud and rivet, as above explained.

I regard the eyeleted tire chain strap as being a valuable improvement in tire chains and the stud as being a valuable improvement in tire chain tools in addition to the co-operative value which the particular stud and the particular eyelet have in conjunction with each other for purposes which may not have any relation to tire chain problems. The two straps 10 and 27, here described as having particular functions in the tire chain art, may be taken as typical of other straps requiring connection by manipulation between positions of alignment and positions angularly displaced from alignment.

I claim:

1. In combination a strap having a tubular rivet with opposing flanges embedded in the strap, said rivet providing an anchorage socket extending through the strap and a laterally restricted access opening of elongated form leading to said socket from one face of said strap, said socket adjacent the other face of the strap having a width substantially equal to the greatest length of said opening, together with a coacting strap having a button with a relatively small base adjacent the last mentioned strap and an elongated head receivable through the elongated opening of said rivet when aligned therewith, the height of said button being such that said head does not project through said rivet but is engageable in the wider anchorage portion thereof upon angular displacement from its position of entry only when inserted through the aforesaid opening.

2. The combination with two tension elements normally used in alignment and freely manipulatable relatively from said position of alignment to an angular relation, of a button fixed to one of said elements at its lower end and having an upper end portion elongated transversely of the element to which the button is fixed and overhanging the portion of the button fixed to said last mentioned element, and means in the other of said elements providing a socket having an access opening elongated longitudinally of the element in which said socket is disposed and of sufficient size to receive the button when the elongated top portion of the button is disposed longitudinally of the element provided with the socket, said socket opening being too narrow to pass the top of the button when said elements are in mutual alignment.

3. The combination with first and second tension strap elements normally used in alignment and freely manipulatable to relative angular relation, of a tubular rivet in one of said strap elements having adjacent one face of the said element an access opening elongated longitudinally of said element and having adjacent the other face of said element a recess communicating with the access opening and of a form to permit at least limited rotation of a part receivable through said access opening, and a button on the other of said elements projecting therefrom to a height at least approximately no greater than the thickness of said rivet, said button having its outer end portion elongated transversely with respect to the element upon which the button is mounted and receivable through the access opening only in the angular relation of said elements, said button being rotatable in said rivet toward a position in which said elements are in substantial alignment for transmission of tension, said elements being securely interlocked, when aligned, by the engagement of the button in the rivet, without material projection of the button beyond the rivet.

4. The combination with two parts connectible upon angular manipulation, of a button fixed to one of said parts and having its top portion projecting therefrom and elongated transversely of said part, said button tapering progressively from said top portion toward the part upon which it is mounted, whereby the elongated top portion overhangs the portion of the button adjacent said part, the other of said parts having eyelet means providing a socket with a longitudinally elongated access opening adjacent one face of the part provided with the eyelet, said access opening being sufficiently large to receive the elongated top of the button when the button is manipulated to register therewith in an angular relation of said parts and insufficiently large to pass the top of the button when said parts are in alignment, said eyelet means providing within said access opening a socket tapered complementary to the form of the button and enlarged from said access opening to permit rotation of the elongated top of the button from the position of entry into said access opening to an interlocked position in which said parts are substantially aligned.

5. In a connector, the combination with a supporting member, of a stud or button non-rotatably fixed in an end portion of said member and having an overhanging top laterally elongated and from which said stud or button is progressively tapered toward said member.

DAVID W. HUDSON.